United States Patent
Zugelder et al.

(10) Patent No.: US 10,190,589 B2
(45) Date of Patent: Jan. 29, 2019

(54) POTHEAD CABLE SEAL FOR ELECTRIC SUBMERSIBLE MOTORS

(71) Applicant: Summit ESP, LLC, Tulsa, OK (US)

(72) Inventors: Adam Michael Zugelder, Claremore, OK (US); Jeffrey G. Frey, Broken Arrow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/836,858

(22) Filed: Dec. 9, 2017

(65) Prior Publication Data

US 2018/0163728 A1 Jun. 14, 2018

Related U.S. Application Data

(60) Provisional application No. 62/432,058, filed on Dec. 9, 2016.

(51) Int. Cl.
*H01R 13/523* (2006.01)
*F04D 13/06* (2006.01)
(Continued)

(52) U.S. Cl.
CPC .......... *F04D 13/0693* (2013.01); *E21B 43/12* (2013.01); *F04D 13/06* (2013.01);
(Continued)

(58) Field of Classification Search
CPC .................. H01R 13/523; H01R 13/5208
See application file for complete search history.

(56) References Cited

U.S. PATENT DOCUMENTS

| 2,827,508 A | 3/1958 | Roehmann |
| 4,679,875 A | 7/1987 | Ramsey |

(Continued)

FOREIGN PATENT DOCUMENTS

| JP | 10-162893 A | 6/1998 |
| WO | 2015120357 A1 | 8/2015 |

OTHER PUBLICATIONS

Korean Intellectual Property Office, "International Search Report" for PCT Application No. PCT/US2017/065492, dated Mar. 29, 2018, 3 pages.

(Continued)

*Primary Examiner* — Hung V Ngo
(74) *Attorney, Agent, or Firm* — Gilliam IP PLLC

(57) ABSTRACT

A pothead cable seal for electric submersible motors. An electric submersible motor pothead system including a pothead that couples a power cable to an electric submersible motor operable in well fluid, the pothead including a finger seal including a finger around each phase of the power cable and a radial flange, a compression plate that exerts a radial force on each phase from an axial load provided by the compression plate against the radial flange, a seal seat including sockets that receive each finger; a space extending between a portion of an outer diameter of each finger and a flared inner diameter of the socket of the seal seat, and a seal ring extending circumferentially around an outer diameter of each finger and tangent to the flange, the seal ring contacting the flared inner diameter of the seal seat and closing the space to the ingress of well fluid.

19 Claims, 6 Drawing Sheets

(51) Int. Cl.
  *F04D 13/10* (2006.01)
  *H01R 13/52* (2006.01)
  *E21B 43/12* (2006.01)
  *F04D 29/08* (2006.01)
  *H02K 5/132* (2006.01)
  *F04D 13/08* (2006.01)

(52) U.S. Cl.
  CPC ............. *F04D 13/08* (2013.01); *F04D 13/10* (2013.01); *F04D 29/08* (2013.01); *H01R 13/52* (2013.01); *H01R 13/5202* (2013.01); *H01R 13/523* (2013.01); *H01R 13/5205* (2013.01); *H02K 5/132* (2013.01); *F04C 2240/40* (2013.01); *F04D 13/086* (2013.01)

(56) References Cited

U.S. PATENT DOCUMENTS

| | | |
|---|---|---|
| 5,700,161 A | 12/1997 | Plummer et al. |
| 6,153,830 A | 11/2000 | Montena |
| 6,361,342 B1 | 3/2002 | Cox |
| 6,676,447 B1 | 1/2004 | Knox |
| 7,455,541 B2 | 11/2008 | Jackson et al. |
| 7,942,696 B2 | 5/2011 | Watson |
| 8,512,074 B2 | 8/2013 | Frey |
| 8,766,110 B2 | 7/2014 | Daughtry et al. |
| 9,470,216 B2 | 10/2016 | Reeves et al. |
| 2009/0269956 A1 | 10/2009 | Frey et al. |
| 2012/0052721 A1 | 3/2012 | Watson |
| 2012/0100737 A1* | 4/2012 | Frey .................... H01R 13/523 439/271 |
| 2014/0147301 A1 | 5/2014 | Reeves et al. |
| 2015/0325943 A1 | 11/2015 | Frey et al. |
| 2018/0090874 A1 | 3/2018 | Frey et al. |

OTHER PUBLICATIONS

International Searching Authority, "Written Opinion of the International Searching Authority" for PCT Application No. PCT/US2017/065492, dated Mar. 29, 2018, 7 pages.

* cited by examiner

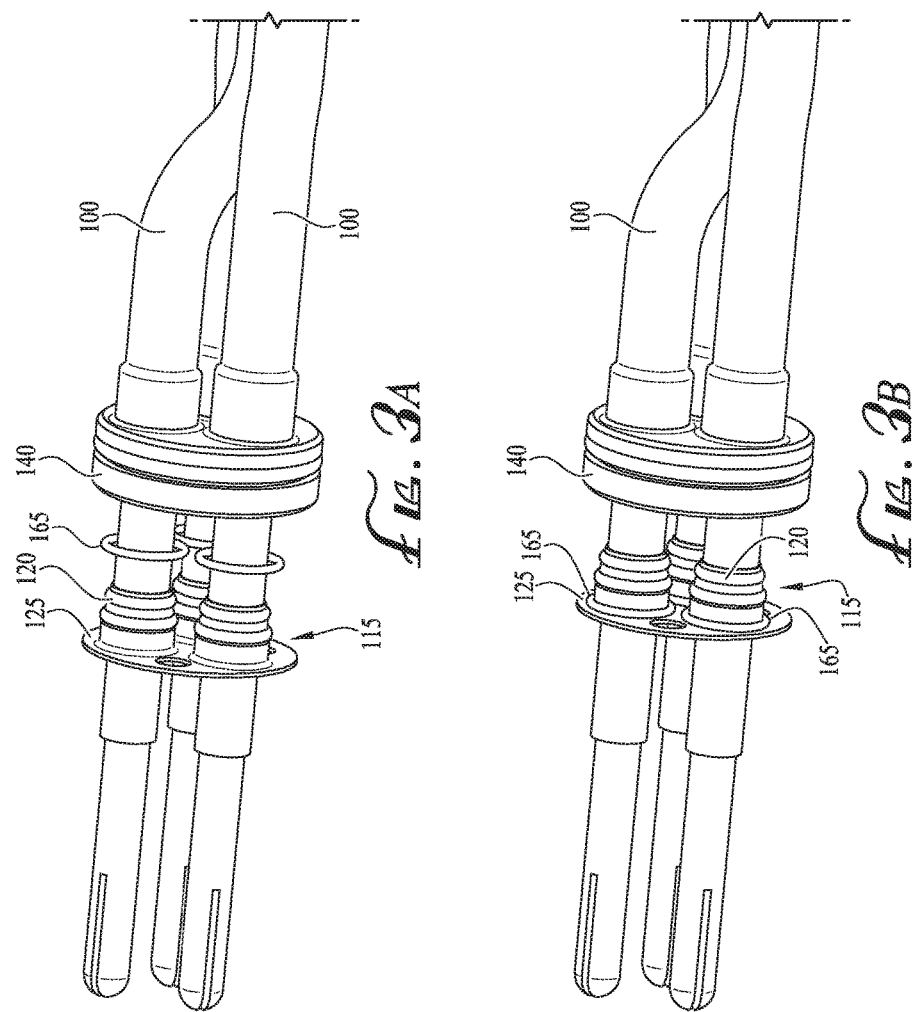

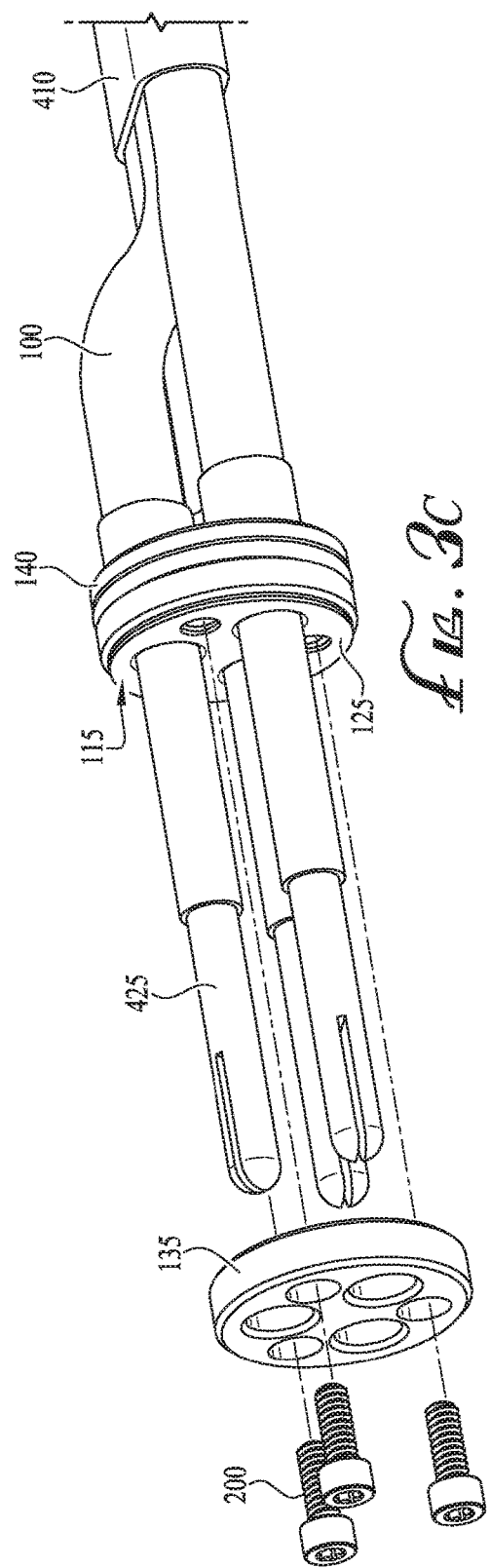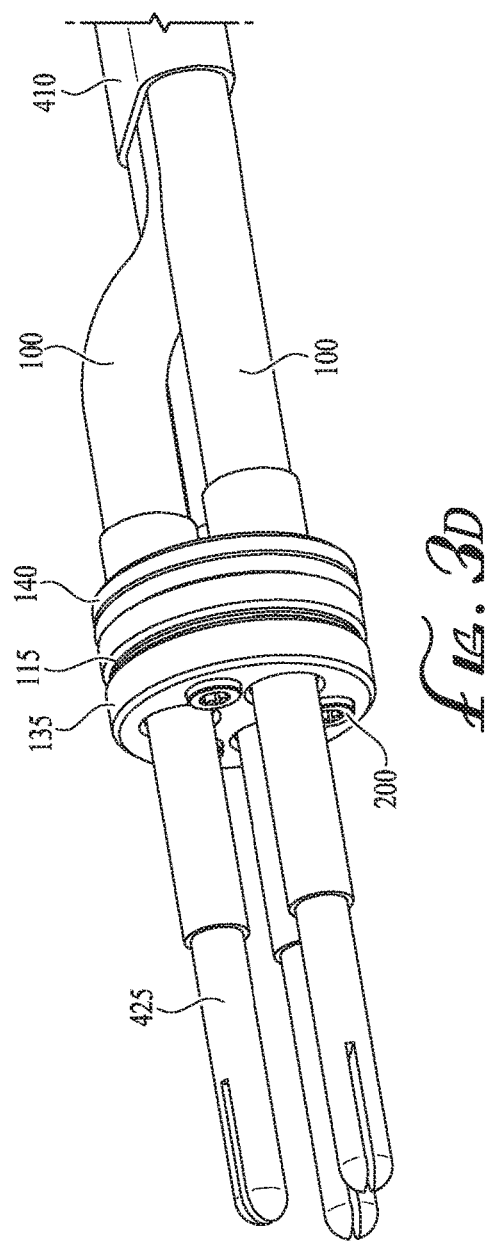

POTHEAD CABLE SEAL FOR ELECTRIC SUBMERSIBLE MOTORS

CROSS REFERENCE TO RELATED APPLICATIONS

This application claims the benefit of U.S. Provisional Application No. 62/432,058 to Zugelder et al., filed Dec. 9, 2016 and entitled "CABLE-TO-POTHEAD SEAL," which is hereby incorporated by reference in its entirety.

BACKGROUND OF THE INVENTION

1. Field of the Invention

Embodiments of the invention described herein pertain to the field of electric submersible motor power cable connections. More particularly, but not by way of limitation, one or more embodiments of the invention enable a pothead cable seal for electric submersible motors.

2. Description of the Related Art

Fluid, such as natural gas, oil or water, is often located in underground formations. When pressure within the well is not enough to force fluid out of the well, the fluid must be pumped to the surface so that it can be collected, separated, refined, distributed and/or sold. Centrifugal pumps are typically used in electric submersible pump (ESP) applications for lifting well fluid to the surface. Centrifugal pumps accelerate a working fluid through a rotating impeller, which is driven by a rotating shaft.

The shaft's rotation is powered by an electrical motor located on the upstream side of the pump assembly. The motor is typically a two-pole, three-phase squirrel cage induction motor. The ESP power source is located at the wellhead and is connected to the motor by insulated, electrical conductors, which extend alongside the ESP assembly down into the wellbore. The motor lead extension (MLE) cable, also referred to as the motor flat, is a low-profile, flat cable that is spliced to the lower end of the main power cable, banded to the side of the ESP pump and seal-chamber section, and has the male termination for plugging or splicing into the motor electrical connection. At the connection point to the motor, the MLE extends through a protected electrical connector that engages with an electrical receptacle on the motor. The electrical connector is sometimes referred to in the art as a "pothead," named after the potted or encapsulated conductors inside the electrical connector. Well fluid should not contact the motor's electrical cables or electrical connections to avoid failure of the cables providing power to the motor. Failure of the power cables may cause inadequate power to the motor and failure of the motor.

The conventional pothead includes a corrosion-resistant steel body and elastomeric insulating material used within the body that attempts to seal and insulate the electrical connections. One conventional approach to isolating the motor power cables from well fluid has been to assemble a pothead with uncured rubber. The rubber is baked to cure the rubber and form a tight barrier to well fluid around the power cables. The barrier must be tight in order to keep well fluid out. A problem that arises is that the rubber cures so tightly that there is no free space left inside the pothead body. As the ESP assembly operates, its temperature increases and the power cables expand in response to the temperature rise. Without free space inside the pothead body, the rubber insulation presses the cable so forcefully that the cable insulation sheers, leading to cable failure.

Another conventional approach to sealing ESP motor cable connections has been to force a wedged shaped material between a pair of apposed insulators. However, like the cured rubber approach, these wedged insulators similarly suffer from a dearth of space to accommodate thermal expansion.

As is apparent from the above, current electrical pothead connections are not able to provide a tight seal while allowing for thermal expansion. Therefore, there is a need for an improved pothead cable seal for electric submersible motors.

BRIEF SUMMARY OF THE INVENTION

One or more embodiments of the invention enable a pothead cable seal for electric submersible motors.

A pothead cable seal for electric submersible motors is described. An illustrative embodiment of an electric submersible motor pothead system includes a pothead that couples a power cable to an electric submersible motor, the electric submersible motor operable in well fluid, the pothead including a finger seal including a finger around each phase of the power cable and a radial flange, a compression plate that exerts a radial force on each phase from an axial load provided by the compression plate against the radial flange, a seal seat including sockets that receive each finger, a space extending between a portion of an outer diameter of each finger and a flared inner diameter of the socket of the seal seat, and a seal ring extending circumferentially around an outer diameter of each finger and tangent to the radial flange, the seal ring contacting the flared inner diameter of the seal seat and closing the space to the ingress of well fluid. In some embodiments, the space accommodates thermal expansion of pothead components while the pothead seals a connection between the electric submersible motor power cable and the electric submersible motor from the well fluid. In certain embodiments, the fingers extend axially around the phase, and the seal ring squeezes the finger of the finger seal creating a seal to well fluid between insulation of the electric submersible motor power cable and the finger seal. In some embodiments, each finger includes at least one rib around the finger and facing the seal seat, the at least one rib spaced along the finger and contacting the flared inner diameter. In certain embodiments, each phase includes a conductor surrounded by insulation, and the electric submersible power cable includes armor that holds the phases together prior to entry into the pothead. In some embodiments, the compression plate and the seal seat are insulating blocks. In certain embodiments, the space increases in diameter as it extends towards the radial flange.

An illustrative embodiment of an electric submersible motor pothead system includes a pothead forming an electrical connector engaged with an electric submersible motor, the pothead including a plurality of power cable phases extending through the pothead, a finger seal extending around the plurality of power cable phases inside the pothead, the finger seal including a finger extending axially and around each power cable phase extending through the finger, a protruding rib extending around each finger, and a radially extending flange extending around a bottom of the fingers, the finger seal compressed between a compression plate below the radially extending flange, and a seal seat above the radially extending flange and including a socket that surrounds and receives each finger, the sockets of the seal seat each having a flared inner diameter extending around each finger, the flared inner diameter contacting the protruding ribs and forming a space between each finger and the flared inner diameter of the seal seat, a seal ring secured around each finger below the protruding rib, and the seal ring closing the space between the finger and the flared inner diameter of the seal seat. In some embodiments, the seal ring and the finger seal comprise one of ethylene propylene diene monomer (EPDM) or a heat resistant fluororubber. In certain embodiments, there are three power cable phases in the plurality of power cable phases and three fingers of the finger seal, and an axial portion of each finger extends circumferentially around each power cable phase. In some embodiments, there are a plurality of protruding ribs extending around each finger. In certain embodiments, each power cable phase in the plurality of power cable phases includes a copper conductor surrounded by cable insulation. In some embodiments, the seal ring is seated in a corner between the radially extending flange and the finger, and positioned between the finger seal and a bevel of the flared inner diameter of the seal seat. In some embodiments, the electric submersible motor is a three-phase, two-pole squirrel cage induction motor operating to turn a downhole electric submersible pump. In certain embodiments, the electric submersible motor operates at temperatures of between about 450° F.-475° F. In some embodiments, the seal ring is tangent to the radially extending flange.

An illustrative embodiment of a pothead for electrically connecting a power cable to an electric submersible motor, the pothead including an insulating block including a plurality of openings, a finger seal including a finger extending through each opening of the plurality of openings, each opening including a tapered inner diameter facing the finger extending through the opening, each finger including at least one rib extending circumferentially around the finger and contacting the tapered inner diameter, and a phase of the power cable extending through each finger. In some embodiments, the pothead further includes a radial flange extending around the finger seal. In certain embodiments, the pothead further includes a second insulating block compressing the radial flange. In certain embodiments, the pothead further includes an elastomeric seal ring around each finger at a corner between the radial flange and the finger. In some embodiments, the insulating block further includes a sleeve extending axially above the finger around the phase of the power cable.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which:

FIGS. 3A-3D are perspective views of a pothead cable sealing system of an illustrative embodiment being installed on a three-phase cable.

Figure 1:
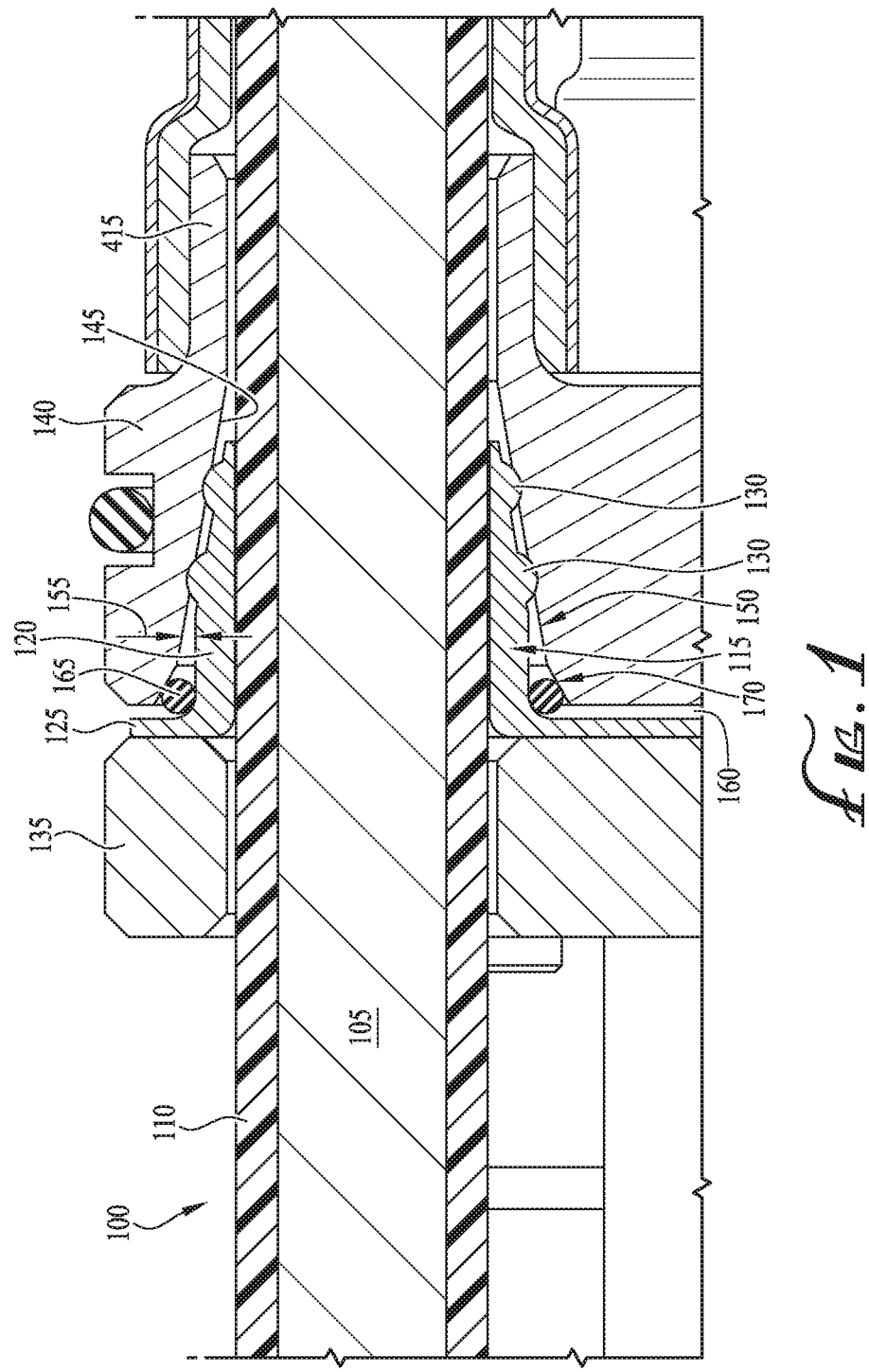
FIG. 1 is a cross-sectional view of a pothead cable seal of an illustrative embodiment.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A pothead cable seal for electric submersible motors is described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a finger includes one or more fingers.

"Coupled" refers to either a direct connection or an indirect connection (e.g., at least one intervening connection) between one or more objects or components. The phrase "directly attached" means a direct connection between objects or components.

"Downstream" refers to the longitudinal direction substantially with the principal flow of lifted fluid when the pump assembly is in operation. By way of example but not limitation, in a vertical downhole electric submersible motor, the downstream direction may be towards the surface of the well.

"Upstream" refers to the longitudinal direction substantially opposite the principal flow of lifted fluid when the pump assembly is in operation. By way of example but not limitation, in a vertical downhole electric submersible motor, the upstream direction may be opposite the surface of the well.

As used herein, the term "outer," "outside" or "outward" means the radial direction away from the electric submersible pump (ESP) power cable phase and/or the opening of a component through which the phase would extend. In the art, "outer diameter" and "outer circumference" are sometimes used equivalently. As used herein, the outer diameter is used to describe what might otherwise be called the outer circumference of a pothead component such as a finger.

As used herein, the term "inner", "inside" or "inward" means the radial direction toward the center of the ESP power cable phase and/or the opening of a component through which the phase would extend. In the art, "inner diameter" and "inner circumference" are sometimes used equivalently. As used herein, the inner diameter is used to describe what might otherwise be called the inner circumference of a pump component such as an insulating block socket.

As used herein the terms "axial", "axially", "longitudinal" and "longitudinally" refer interchangeably to the direction extending along the length of an ESP power cable.

As used in this specification and the appended claims, with respect to a downhole ESP assembly, the "top" of a component means the downstream-most side of the component, without regard to whether the element is oriented horizontally or vertically. The "bottom" of a component means the upstream-most side of the component, without regard to whether the element is oriented horizontally or vertically.

As used in this specification and the appended claims, "insulator block" and "insulating block" refer interchangeably to a block or plate inside a pothead housing, such as a compression plate or seal seat, which surrounds and/or holds the electrical connections inside the pothead. As used herein, "insulator block" or "insulating block" is not limited to blocks made of insulating material such as rubber or polyether ether ketone (PEEK). Illustrative embodiments also include an insulator block or insulating block made of corrosion resistant steel or another similar material without insulating properties.

For ease of description, the illustrative embodiments described herein are described in terms of an ESP assembly making use of a three-phase motor and three-phase power cable. However, the pothead of illustrative embodiments is not so limited and may be applied to any motor, with any number of phases, exposed to fluid and having a motor plug-in, splice-in or tape-in electrical connection. For example, the barrier of illustrative embodiments may be applied to submersible motors in axial-flow pumps, radial-flow pumps, mixed-flow pumps, horizontal surface pumps, and/or turbine regenerative type pumps.

Illustrative embodiments may provide a flanged electrical connector that creates a barrier to fluid around an ESP motor's insulated electrical cable while still allowing for thermal expansion of the power cable and pothead insulating components. An elastomeric three-phase finger seal may be employed to create radial force from an axial load. Compressive force may be generated by compressing the finger seal between a compression plate and a seal seat, which may distribute the compression force radially around the electrical cable, similar to a compression fitting. The finger seal may include an opening for each phase, and have fingers that are compressed radially onto the insulation of each individual cable phase. In order for the finger seal to create a barrier to fluid at various pressures and temperatures, the finger seal may fit snugly onto the cable insulation, despite variation in cable diameter that typically occurs due to discrepancies in cable size during manufacturing.

Illustrative embodiments may accommodate diameter variations in the power cables and thermal expansion of the pothead components by strategic placement of a space and seal ring providing a secondary seal. The space may be left between the flange of the finger seal and a rib protruding from the outer diameter of the finger seal openings. The seal ring may be an elastic material similar to the finger seal, although the hardness may be adjusted to maximize seal effectiveness. A seal ring may be placed around the outer diameter of each finger, tangent to the flange. The seal rings may contact a taper in the seal seat and close the space as the compression plate and seal seat are screwed together. Depending on the cable diameter, the diameter and/or thickness of the seal ring may be varied to maximize seal effectiveness. The seal ring may squeeze the fingers extending around the cable insulation to create a seal between the cable insulation and the finger seal at low pressure without the need for a substantial axial force. The finger seal may evenly distribute the load of the seal ring to the cable insulation, preventing a "point load," which might otherwise sheer the cable insulation. Illustrative embodiments may allow a single custom part, the molded finger seal, which may be modified to fit a variety of cable sizes easily and inexpensively by virtue of the features of illustrative embodiments including the space and modifiable seal ring, while maintaining a superior seal and/or resistance to fluid despite operating temperatures as high as 450° F.-475° F. where the pothead components may be subject to thermal expansion.

Figure 5:
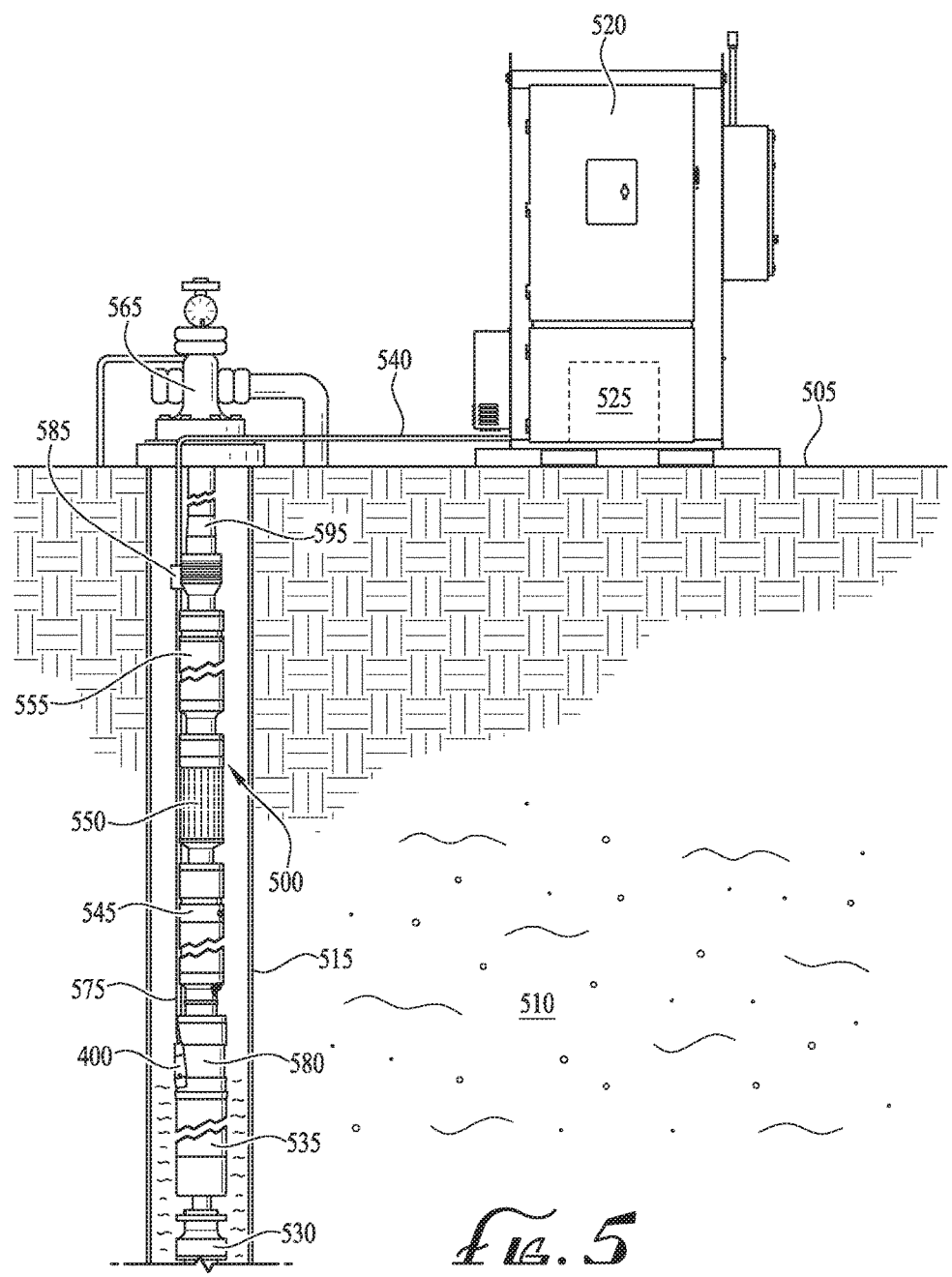
FIG. 5 is a perspective view of an electric submersible pump (ESP) assembly employing a pothead cable seal of an illustrative embodiment.

FIG. 5 illustrates an ESP assembly having a pothead cable seal of an illustrative embodiment. ESP assembly 500 may be located downhole in a well below surface 505. The well may, for example, be several hundred or a few thousand feet deep. ESP assembly 500 may be vertical, horizontal or may be curved, bent and/or angled, depending on well direction. The well may be an oil well, water well, and/or well containing other hydrocarbons, such as natural gas, and/or another production fluid from underground formation 510. ESP assembly 500 may be separated from underground formation 510 by well casing 515. Production fluid may enter well casing 515 through casing perforations (not shown). Casing perforations may be either above or below ESP intake 550.

ESP assembly may include, from bottom to top, downhole sensors 530 which may detect and provide information such motor speed, internal motor temperature, pump discharge pressure, downhole flow rate and/or other operating conditions to a user interface, variable speed drive controller and/or data collection computer on surface 505. ESP motor 535 may be an induction motor, such as a two-pole, three phase squirrel cage induction motor. Power cable 540 may provide power to ESP motor 535 and/or carry data from downhole sensors 530 to surface 505. ESP cabinet 520 at surface 505 may contain a power source 525 to which power cable 540 connects. Downstream of motor 535 may be motor protector 545, ESP intake 550, multi-stage centrifugal ESP pump 555 and production tubing 595. Motor protector 545 may serve to equalize pressure and keep the motor oil separate from well fluid. ESP intake 550 may include intake ports and/or a slotted screen and may serve as the intake to centrifugal ESP pump 555. ESP pump 555 may be a multi-stage centrifugal pump including stacked impeller and diffuser stages. Other components of ESP assemblies may also be included in ESP assembly 500, such as a tandem charge pump (not shown) or gas separator (not shown) located between centrifugal ESP pump 555 and intake 550 and/or a gas separator may serve as the pump intake. Shafts of motor 535, motor protector 545, ESP intake 550 and ESP pump 555 may be connected together (i.e., splined) and be rotated by motor 535. Production tubing 595 may carry lifted fluid from the discharge of ESP pump 555 towards wellhead 565.

Power cable 540 may extend from power source 525 at surface 505 to motor lead extension (MLE) 575. Cable connection 585 may connect power cable 540 to MLE 575. MLE 575 may plug in, tape in, spline in or otherwise electrically connect power cable 540 to motor 535 to provide power to motor 535. Pothead 400 may enclose the electrical connection between MLE 575 and head 580 of motor 535.

Figure 4:
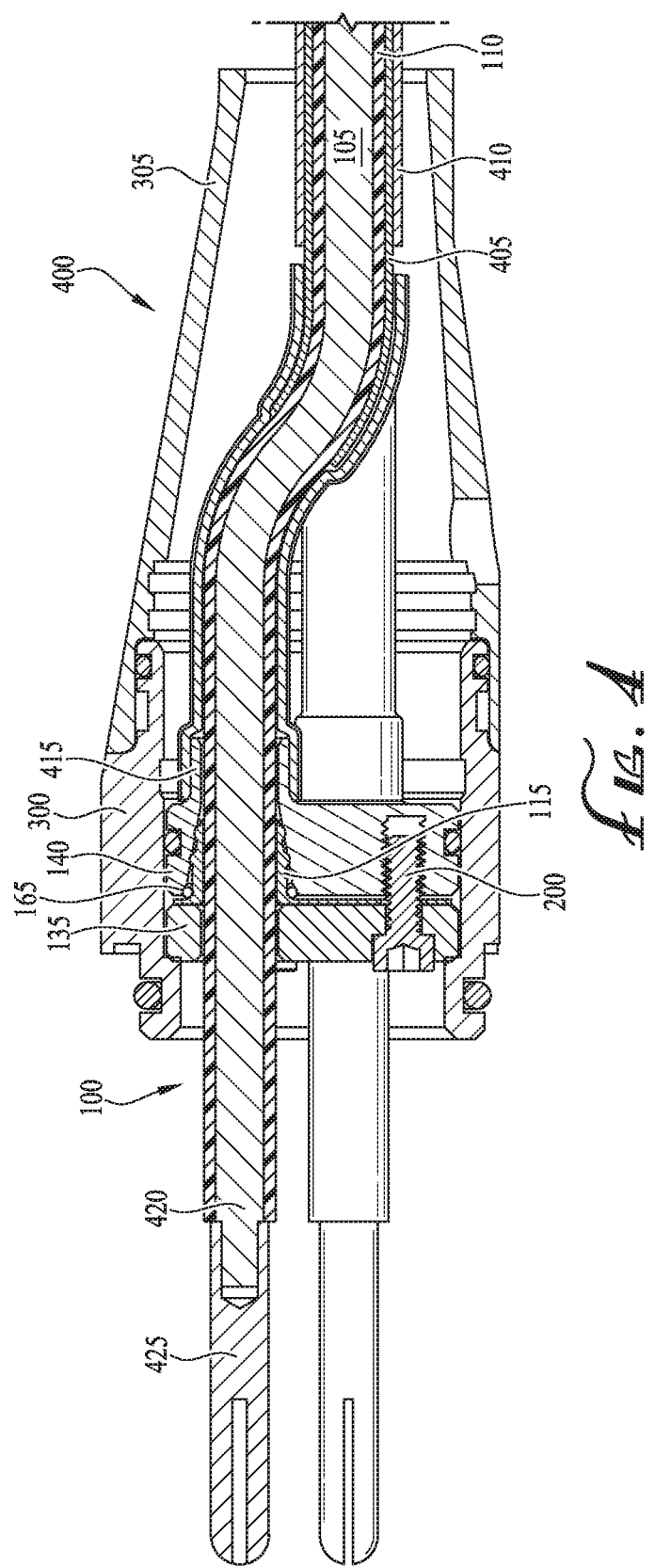
FIG. 4 is a cross sectional view of a pothead of an illustrative embodiment.

Turning to FIG. 1 and FIG. 4, power cable phase 100 may be an insulated electrical cable that includes conductor 105 surrounded by cable insulation 110. Each MLE 575 may include three phases 100 for a three-phase, squirrel cage induction motor 535. Conductor 105 may be copper, aluminum or another similar similarly conductive material employed in power cables. Cable insulation 110 may for example be Ethylene Propylene Diene Monomer (EPDM), rubber, polypropylene, polyethylene, or similar high temperature polymeric elastomer. In a three phase motor, such as an ESP induction motor, three phases 100 may be included in pothead 400 of illustrative embodiments. Cable insulation 110 may be surrounded by extruded lead sheath 405 (shown in FIG. 4) to protect cable insulation 110 as it extends the length of ESP assembly 500 downhole. Lead sheath 405 may terminate inside pothead 400 prior to extension of phase 100 through finger seal 115. Phases 100 of MLE 575 may be held together and surrounded by armor 410 (shown in FIG. 4), which armor 410 may terminate inside pothead 400, proximate the entrance of MLE 575 into pothead 400, to permit phases 100 to separate for connection to motor 535. Conductor 105 of phase 100 with cable insulation 110 may extend through pothead cap 305, through sleeve 415 of seal seat 140, through fingers 120 of finger seal 115, through compression plate 135, and then connect to electrical connector 420. Conducting pins 425 may extend out of electrical connector 420 and transfer current to motor 535 through corresponding electrical receptacles in head 580 of motor 535.

Referring to FIG. 1, finger seal 115 may surround cable insulation 110 of each phase 100 inside pothead 400 below termination of armor 410 and sheath 405, and above connection of electrical connector 420 to conducting pins 425 (shown in FIG. 4). Around each phase 100, finger seal 115 may include finger 120 that may be an axially extending, tubular portion of finger seal 115 surrounding phase 100. Radially extending flange 125 may form a base from which fingers 120 extend axially. In some embodiments, flange 125 may be positioned at the bottom of finger seal 115. Finger seal 115 may be an elastomeric material, such as EPDM, rubber or another similar high temperature elastomer. Each finger 120 of finger seal 115 may be tubularly shaped, with an opening 210 (shown in FIG. 2) extending through the length of finger 120. Phase 100 may extend through opening 210, and finger 120 and may fit snugly around cable insulation 110 of each phase 100. Finger 120 may include one or more circumferential protruding ribs 130 around the outer diameter of finger 120. In FIG. 1, two circumferential ribs 130 are shown spaced apart and extending around finger 120 of finger seal 115.

Figure 2:
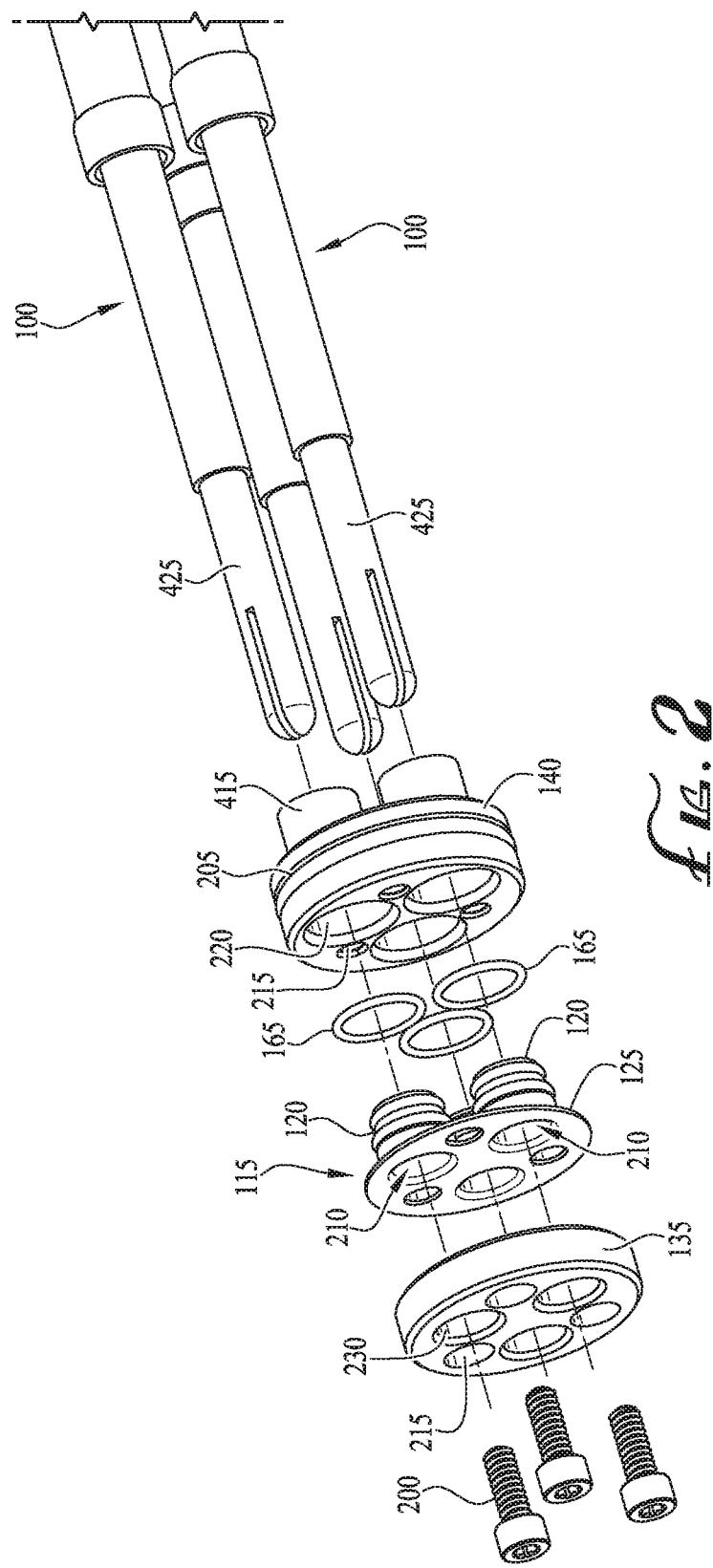
FIG. 2 is an exploded view of a pothead cable seal assembly of an illustrative embodiment.

Within pothead 400, finger seal 115 may be compressed between and/or by two insulating blocks: lower compression plate 135 and upper seal seat 140. Compression plate 135 and seal seat 140 may be composed of a high temperature thermoplastic material such as rubber or PEEK, or another similar insulating material, or may be corrosion resistant steel and/or another corrosion resistant material such as chromium, molybdenum, nickel and/or nickel-copper alloy. Compression plate 135 may be situated below finger seal 115 and pressed up against the bottom of flange 125 and/or pressed against one side of flange 125. Seal seat 140 may be positioned on the opposite side of flange 125 as compression plate 135, and may include sockets 220 to receive fingers 120 of finger seal 115. Seal seat 140 may include one socket 220 for each phase 100 and/or finger 120. Sockets 220 may surround finger seal 115 and include flare 145 on inner diameter (ID) 150 of socket 220 and/or the wall forming socket 220. Sockets 220 may be arranged linearly to form an oval and/or oblong shaped seal seat 140, or may be arranged in a triangular fashion to form a more round and/or rounded seal seat 140. In FIG. 2, three sockets 220 are arranged triangularly around seal seat 140. Openings 210 of finger seal 115 and holes 230 of compression plate 135 may be arranged similarly to sockets 220 of seal seat 140, such that the respective openings align when phases 100 extend through the openings, as shown in FIG. 2.

Inner diameter 150 of socket 220 may flare outwards and/or widen as it extends downwards (or taper inwards and/or narrow at it extends upwards), to form flare 145 shown in FIG. 1. Diameter of flare 145 may increase moving downwards and/or towards flange 125. Inner diameter 150 of socket 220 may contact ribs 130, but may otherwise not touch finger 120 of finger seal 115 at least in low temperatures and/or at initial installation. The outer diameter of fingers 120 may increase as fingers 120 extend towards flange 125 and/or downwards, such that ribs 130 remain in contact with inner diameter 150 of socket, despite flare 145. In some embodiments, the outer diameter of each finger 120 may increase from the top of finger 120 towards and/or until the lowest rib 130, and then the outer diameter of finger 120 may remain constant between the lowest rib 130 and flange 125. Space 155 may then be formed between the outer diameter of finger 120 and inner diameter 150 of socket 220. Space 155 may become larger as flare 145 increases outwards as it extends towards flange 125. In some embodiments, space 155 may be about 0.020 inches diametrically proximate flange 125. Where multiple ribs 130 are included on finger 120, multiple spaces 155 may be formed between ribs 130 and between finger 120 and wall of socket 220 and/or seal seat 140. Gap 160 may be situated between the top of flange 125 and the bottom of seal seat 140.

Seal ring 165, which may be a secondary seal in addition to finger seal 115, may be placed around each axially extending portion 120 of finger seal 115. Seal ring 165 may be an o-ring, a high temperature elastomer such as EPDM, a heat resistant fluororubber such as Aflas (a registered trademark of Asahi Glass Co., Ltd.) and/or another similar high temperature elastomer. Seal ring 165 may be placed around each finger 120, tangent to flange 125 and/or at the corner (intersection) of finger 120 and flange 125. Seal ring 165 may be placed such that space 155 and/or lowermost space 155 is closed and/or seal ring 165 may act as a barrier to close space 155 from fluid that may surround the ESP motor and/or power cable phase 100. Seal ring 165 may be selected from various sizes both diametrically and in thickness and may be made from a similar elastic/pliable material as finger seal 115. A material for seal ring 165 may be selected with a hardness to maximize seal effectiveness. In some embodiments, seal ring 165 may be 1.0 mm, 1.2 mm or 1.4 mm in diameter. Seal ring 165 may squeeze fingers 120 extending around cable insulation 110. This squeezing effect may create a seal between cable insulation 110 and finger seal 115 at low pressure without the need for a substantial axial force. The bottom inner diameter of seal seat 140 may form outward bevel 170, which bevel 170 may accommodate and/or secure seal ring 165 in place tangent to flange 125.

Turning to FIG. 2, screws 200 may be used to press compression plate 135 into seal seat 140. Axial force may be generated by tightening compression screws 200 against compression plate 135. Seal ring 165 may contact flare 145 and/or inner diameter 150, converting the axial force to radial force. By modifying the dimensions of seal ring 165, the amount of force generated may be adjusted and/or a single size finger seal 115 may be adaptable to multiple cable phase 100 diameters. Finger seal 115 may evenly distribute the load of seal ring 165 to cable insulation 110, which may prevent point loading and/or sheering of cable insulation 110.

FIG. 2 illustrates an exploded view of an exemplary finger seal assembly of illustrative embodiments having three phases 100. As shown in FIG. 2, each finger 120 of finger seal 115 may define one opening 210 that receives one phase 100, which phases 100 may include terminal conducting pins 425. Finger seal 115, compression plate 135 and seal seat 140 may include apertures 215 through which compression screws 200 may extend. Seal seat 140 may include O-ring 205 around its outer diameter (OD). In a finger seal assembly of illustrative embodiments, seal seat 140 may first slide around phases 100, followed by seal rings 165. Finger seal 115 may then be installed, and seal rings 165 may be rolled over fingers 120. Seal seat 140 may include sleeves 415 and sockets 220 through which phases 100 may extend. When finger seal 115 is installed, fingers 120 may squeeze between sockets 220 of seal seat 140 and phases 100. Compression plate 135 and screws 200 may then be installed below flange 125 of finger seal 115. Compression plate 135 may also include holes 230 to permit phases to extend through compression plate 135 for electrical connection. In some embodiments, as shown in FIG. 1, the corner of seal seat 140 inner diameter and/or socket 220 inner diameter contacting seal ring 165 may be beveled outward to hug seal ring 165 and secure seal ring 165 in position tangent to flange 125, such as with bevel 170.

FIGS. 3A-3D illustrate a method of installing a finger seal assembly of an illustrative embodiment onto a three-phase power cable. First, three phases 100 may be prepared for installation of finger seal 115 assembly, and seal seat 140 may be installed by placing phases 100 through sockets 220 and/or sliding seal seat 140 around phases 100. Seal seat 140 may include sockets 220, one for each phase 100, through which phases 100 may extend. Next, seal rings 165 may be placed around each phase 100, below seal seat 140, as shown in FIG. 3A. Finger seal 115 may include openings 210, defined by fingers 120, which receive phases 100. Finger seal 115 may include one opening 210 for each phase 100.

FIG. 3A illustrates finger seal 115 installed on phases 100 below seal seat 140. As shown in FIG. 3A, finger seal 115 may initially be placed below seal rings 165. A seal ring 165 may then be rolled onto each finger 120. Seal rings 165 may be rolled until they are tangent to the top of flange 125 and/or proximate the bottom of finger 120 and/or in the corner between flange 125 and finger 120, as shown in FIG. 3B. Finger seal 115 with seal rings 165 may then be pushed into seal seat 140, as shown in FIG. 3C. When pushed into seal seat, fingers 120 may squeeze and/or slide between sockets 220 and cable insulation 110 of phase 100. Compression plate 135 may then be installed below flange 125 of finger seal 115 as illustrated in FIG. 3D. Compression screws 200 may be installed through apertures 215 and tightened, as shown in FIG. 3D. Finally, pothead base 300 and cap 305 may be installed around the insulation as shown in FIG. 4. Pothead base 300 and cap 305 may be lead, gold and/or another gas impermeable material, in order to prevent gas from permeating into motor 535 electrical connections.

A pothead cable seal apparatus, system and method has been described. Illustrative embodiments may provide a barrier to well fluid at the electrical connection between an electrical submersible motor and its power cable, such as the connections in an ESP assembly. Illustrative embodiments may provide an improved seal to well liquid such as oil or water, while allowing for thermal expansion that may occur in high temperature wells, such as well temperatures of up to 475° F. Illustrative embodiments may provide a barrier to well fluid in high temperature wells, prevent point loading and sheering of power cable insulation, and may be readily adaptable to power cables of varying diameters through the use of a finger seal assembly of illustrative embodiments.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. An electric submersible motor pothead system, comprising:
    a pothead that couples a power cable to an electric submersible motor, the electric submersible motor operable in well fluid, the pothead comprising:
    a finger seal comprising a finger around each phase of the power cable and a radial flange;
    a compression plate that exerts a radial force on each phase from an axial load provided by the compression plate against the radial flange;
    a seal seat comprising sockets that receive each finger;
    a space extending between a portion of an outer diameter of each finger and a flared inner diameter of the socket of the seal seat; and
    a seal ring extending circumferentially around an outer diameter of each finger and tangent to the radial flange, the seal ring contacting the flared inner diameter of the seal seat and closing the space to the ingress of well fluid.

2. The electric submersible motor pothead system of claim 1, wherein the space accommodates thermal expansion of pothead components while the pothead seals a connection between the electric submersible motor power cable and the electric submersible motor from the well fluid.

3. The electric submersible motor pothead system of claim 1, wherein the fingers extend axially around the phase, and the seal ring squeezes the finger of the finger seal creating a seal to well fluid between insulation of the electric submersible motor power cable and the finger seal.

4. The electric submersible motor pothead system of claim 1, wherein each finger comprises at least one rib around the finger and facing the seal seat, the at least one rib spaced along the finger and contacting the flared inner diameter.

5. The electric submersible motor pothead system of claim 1, wherein each phase comprises a conductor surrounded by insulation, and the electric submersible power cable comprises armor that holds the phases together prior to entry into the pothead.

6. The electric submersible motor pothead system of claim 1, wherein the compression plate and the seal seat are insulating blocks.

7. The electric submersible motor pothead system of claim 1, wherein the space increases in diameter as it extends towards the radial flange.

8. An electric submersible motor pothead system comprising:
- a pothead forming an electrical connector engaged with an electric submersible motor, the pothead comprising a plurality of power cable phases extending through the pothead;
- a finger seal extending around the plurality of power cable phases inside the pothead, the finger seal comprising:
  - a finger extending axially and around each power cable phase extending through the finger,
  - a protruding rib extending around each finger, and
  - a radially extending flange extending around a bottom of the fingers;
- the finger seal compressed between:
  - a compression plate below the radially extending flange, and
  - a seal seat above the radially extending flange and comprising a socket that surrounds and receives each finger;
- the sockets of the seal seat each having a flared inner diameter extending around each finger, the flared inner diameter contacting the protruding ribs and forming a space between each finger and the flared inner diameter of the seal seat;
- a seal ring secured around each finger below the protruding rib; and
- the seal ring closing the space between the finger and the flared inner diameter of the seal seat.

9. The electric submersible motor pothead system of claim 8, wherein the seal ring and the finger seal comprise one of ethylene propylene diene monomer (EPDM) or a heat resistant fluororubber.

10. The electric submersible motor pothead system of claim 8, wherein there are three power cable phases in the plurality of power cable phases and three fingers of the finger seal, and an axial portion of each finger extends circumferentially around each power cable phase.

11. The electric submersible motor pothead system of claim 8, wherein there are a plurality of protruding ribs extending around each finger.

12. The electric submersible motor pothead system of claim 8, wherein each power cable phase in the plurality of power cable phases comprises a copper conductor surrounded by cable insulation.

13. The electric submersible motor pothead system of claim 8, wherein the seal ring is seated in a corner between the radially extending flange and the finger, and positioned between the finger seal and a bevel of the flared inner diameter of the seal seat.

14. The electric submersible motor pothead system of claim 8, wherein the electric submersible motor is a three-phase, two-pole squirrel cage induction motor operating to turn a downhole electric submersible pump.

15. The electric submersible motor pothead system of claim 14, wherein the electric submersible motor operates at temperatures of between about 450° F.-475° F.

16. The electric submersible motor pothead system of claim 8, wherein the seal ring is tangent to the radially extending flange.

17. A pothead for electrically connecting a power cable to an electric submersible motor, the pothead comprising:
- an insulating block comprising a plurality of openings;
- a finger seal comprising a finger extending through each opening of the plurality of openings, each opening comprising a tapered inner diameter facing the finger extending through the opening;
- a radial flange extending around the finger seal;
- an elastomeric seal ring around each finger at a corner between the radial flange and the finger;
- each finger comprising at least one rib extending circumferentially around the finger and contacting the tapered inner diameter; and
- a phase of the power cable extending through each finger.

18. The pothead of claim 17, further comprising a second insulating block compressing the radial flange.

19. The pothead of claim 17, wherein the insulating block further comprises a sleeve extending axially above the finger around the phase of the power cable.

* * * * *